United States Patent [19]
Alexander

[11] Patent Number: 6,123,496
[45] Date of Patent: *Sep. 26, 2000

[54] AUTOMATIC WHEEL CHOCK

[75] Inventor: James C Alexander, London, Canada

[73] Assignee: United Dominion Ind., Inc., Charlotte, N.C.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/917,690

[22] Filed: Aug. 26, 1997

Related U.S. Application Data

[63] Continuation of application No. 08/679,719, Jul. 11, 1996, Pat. No. 5,743,697, which is a continuation of application No. 08/350,132, Nov. 29, 1994, abandoned.

[51] Int. Cl.⁷ .................................................. B65G 67/02
[52] U.S. Cl. ........................ 414/401; 414/584; 414/396; 188/32
[58] Field of Search .................................. 414/401, 584, 414/396, 426, 427, 428, 563; 188/32; 269/55

[56] References Cited

U.S. PATENT DOCUMENTS

| | | | |
|---|---|---|---|
| 2,801,011 | 7/1957 | Overlach et al. | 414/255 |
| 4,207,019 | 6/1980 | Cone | 414/401 X |
| 4,911,603 | 3/1990 | Pollner et al. | 414/429 X |

FOREIGN PATENT DOCUMENTS 44 27 406 C1  10/1995  Germany.

*Primary Examiner*—Frank E. Werner
*Attorney, Agent, or Firm*—Sughrue, Mion, Zinn, Macpeak & Seas, PLLC

[57] ABSTRACT

A system for restraining a vehicle, such as a truck having a pair of separated tires mounted on an axle, positioned at a loading dock. A member is movable from a stored position near or under the loading dock to an operative position under the vehicle and located between said separated tires. A pair of restraining elements are mounted on the movable member and are movable from a stored position between the tires to an outward extended position where each of the restraining elements engage a respective one of said pair tires. A mechanism, such as an hydraulic system, is mounted to said member at one end and to a fixed point at the other to move the member to a position under the vehicle. The pair of restraining elements is moved to the outward extended position by action of the moving mechanism for the member or by movement of a sensor that contacts a tire.

11 Claims, 10 Drawing Sheets

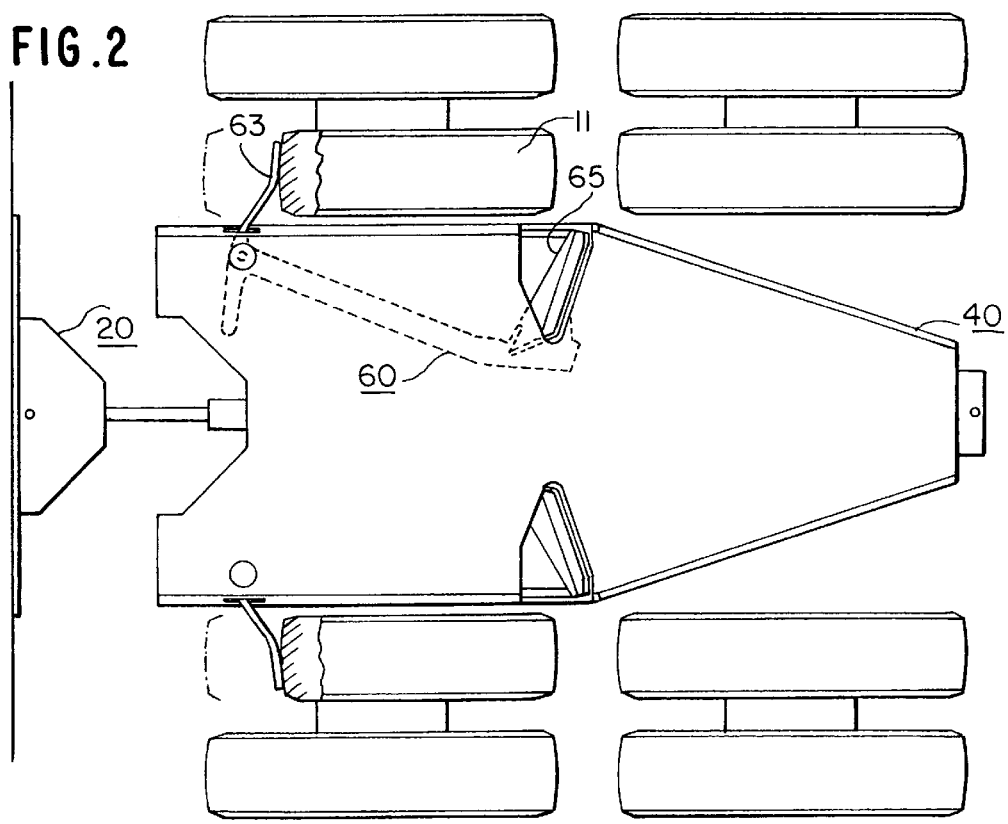
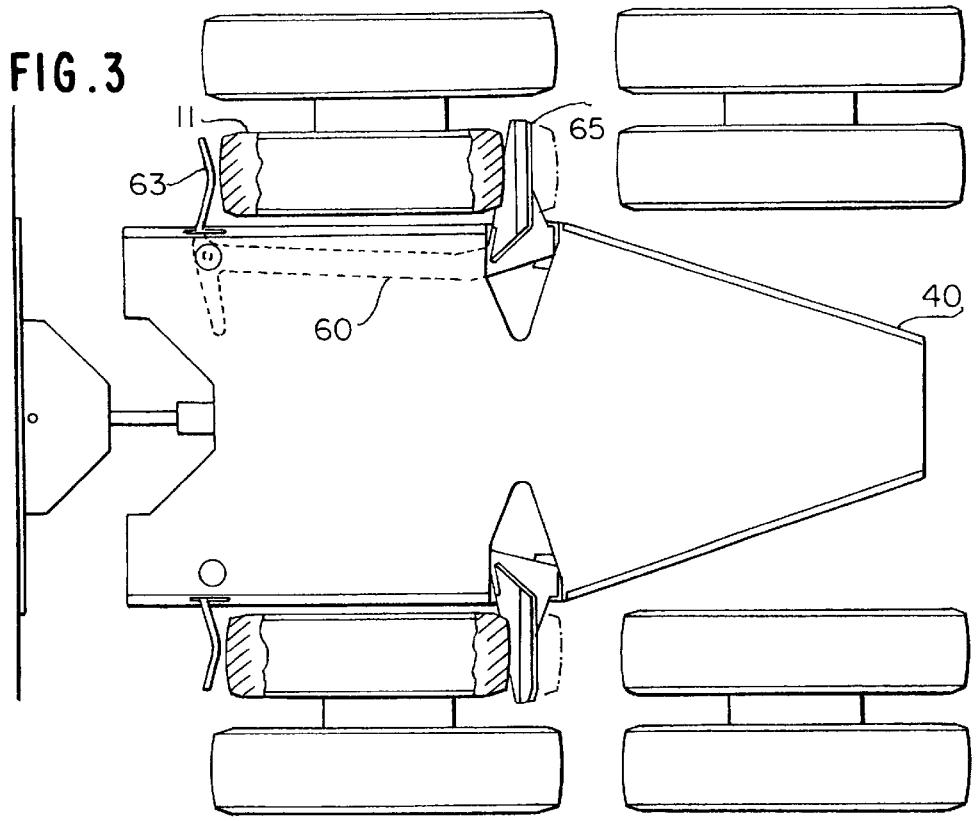

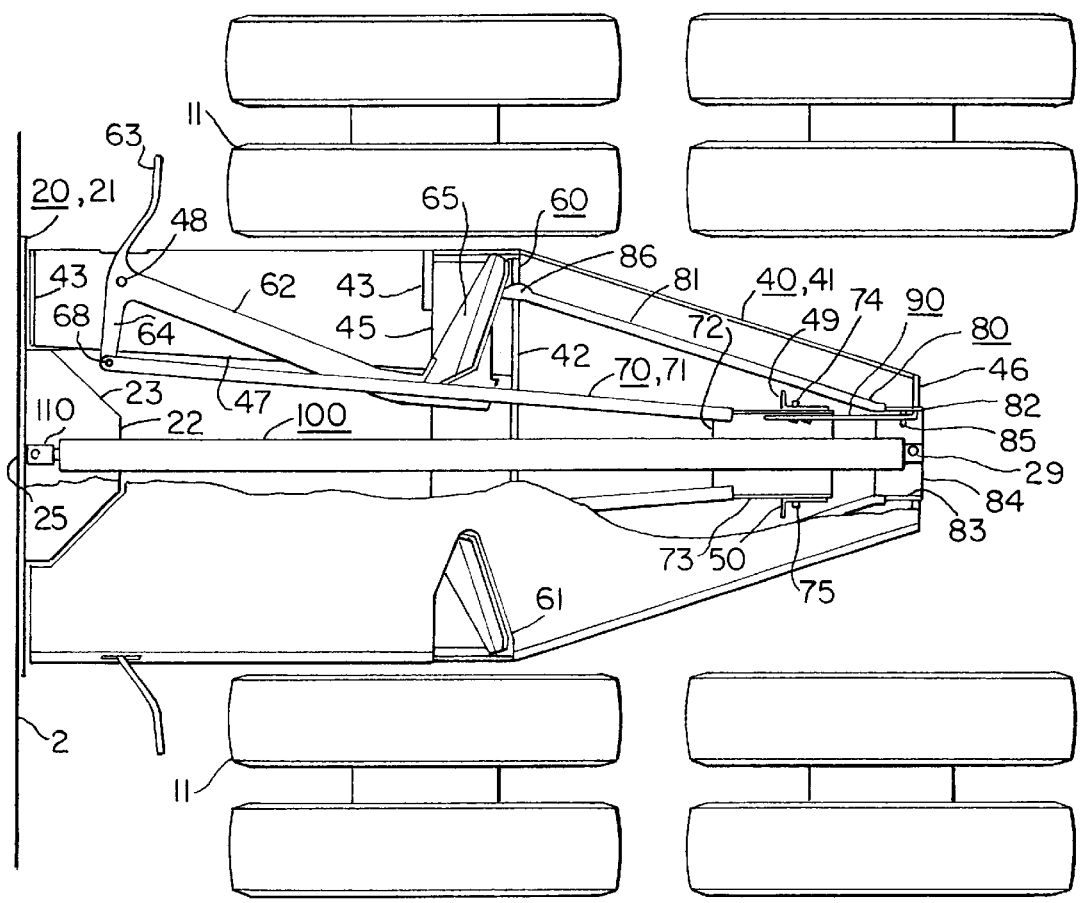
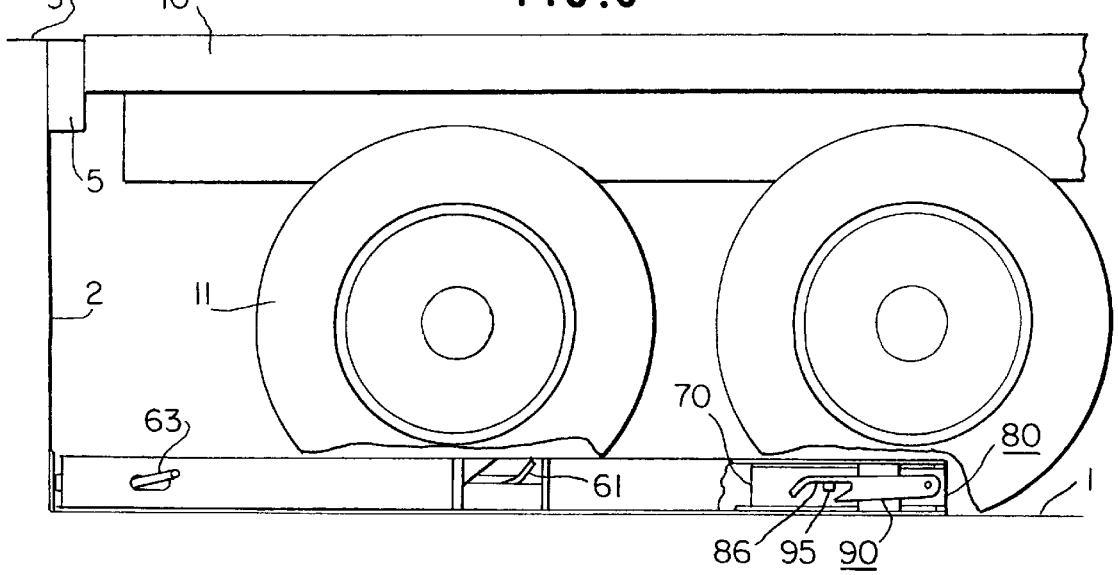

FIG.6A
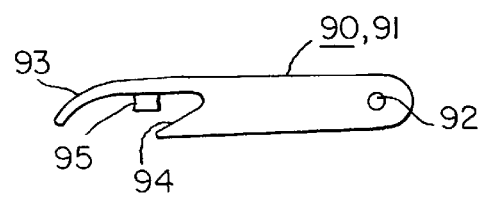
FIG.6B
FIG.7
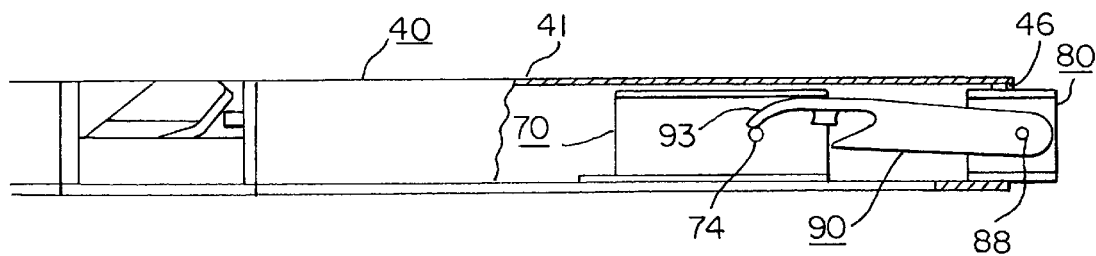

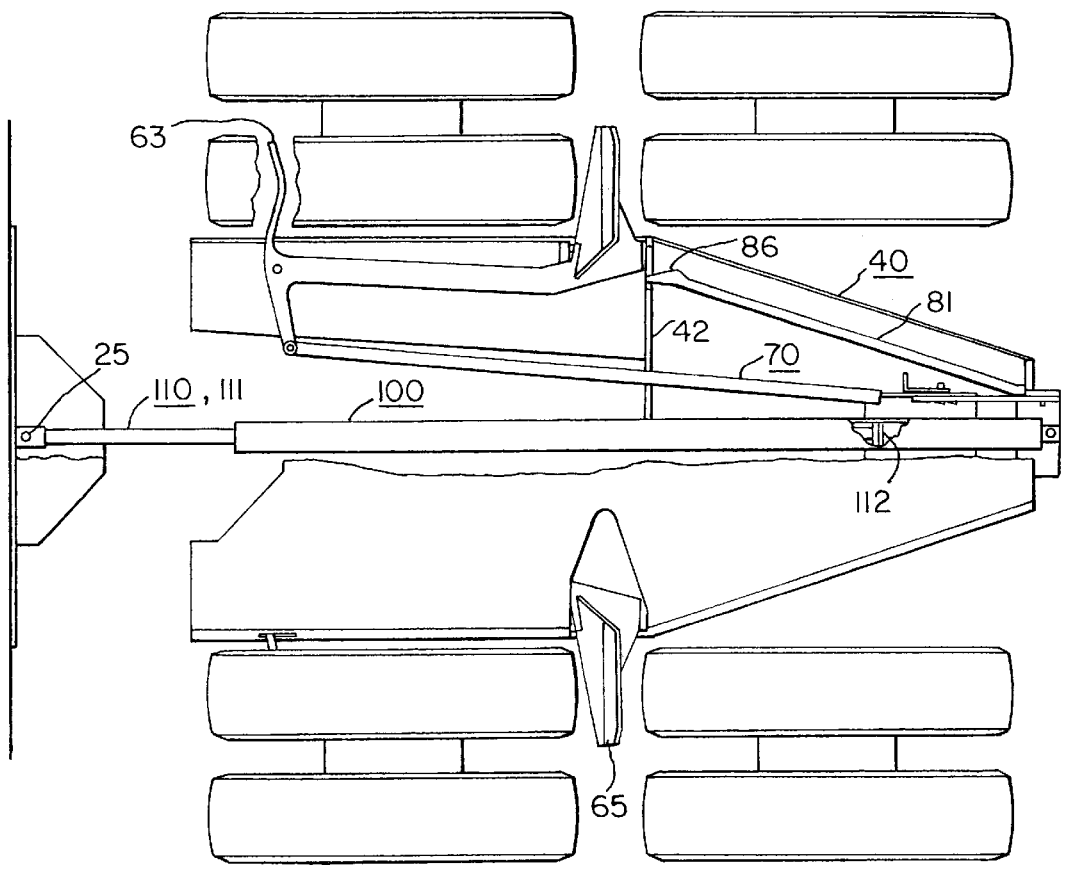
FIG.8
FIG.9
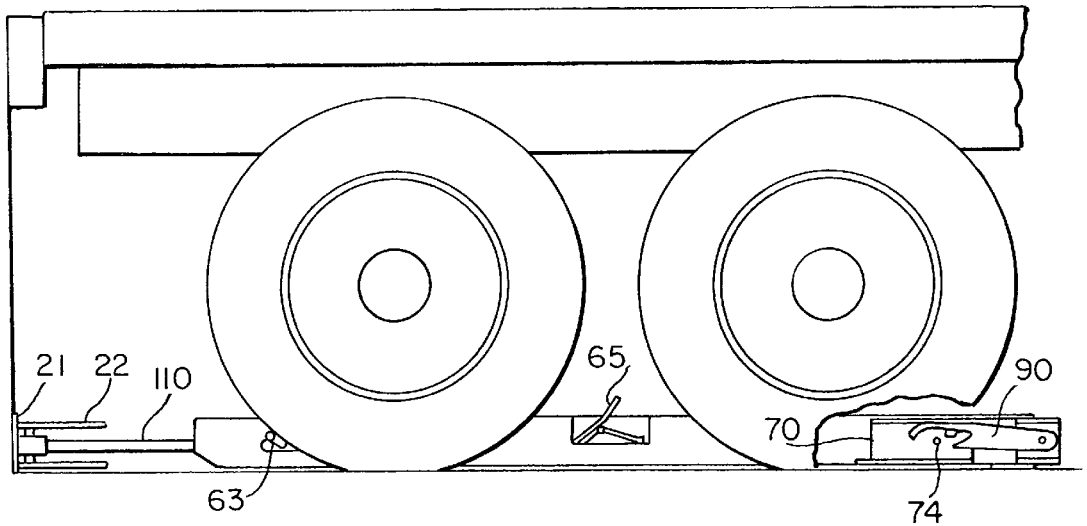

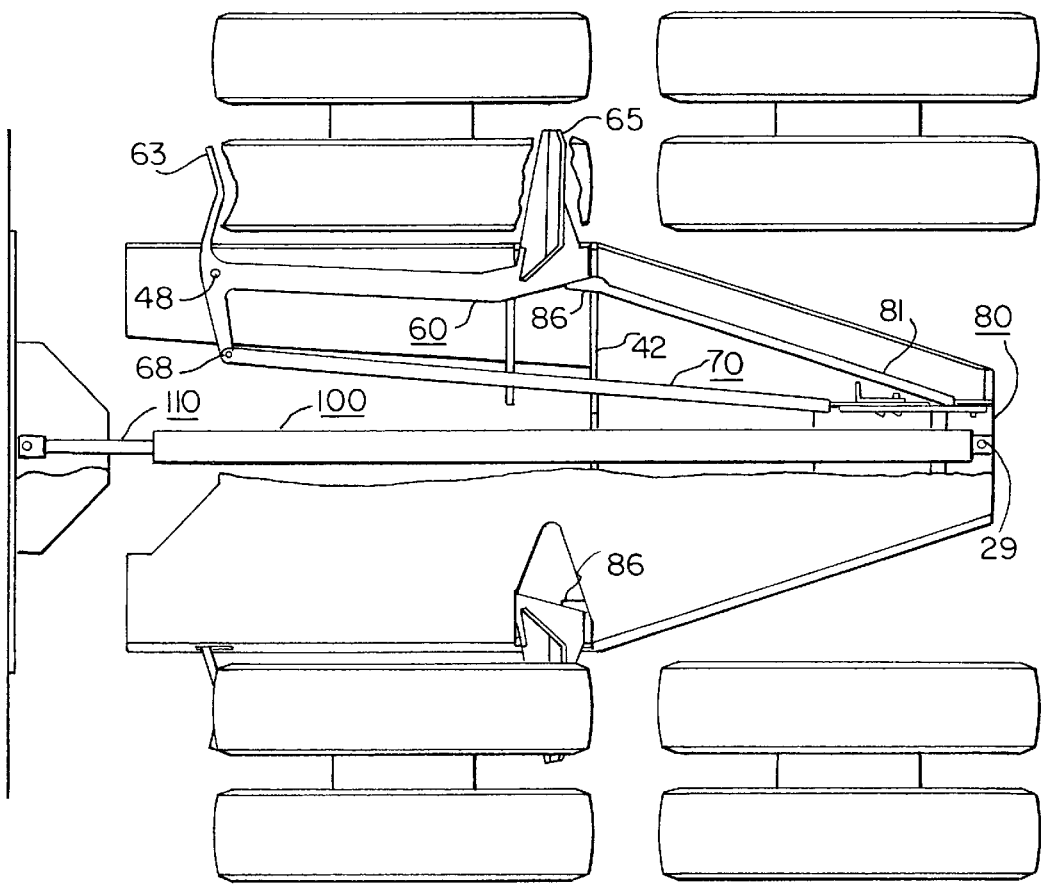
FIG. 10
FIG. 11
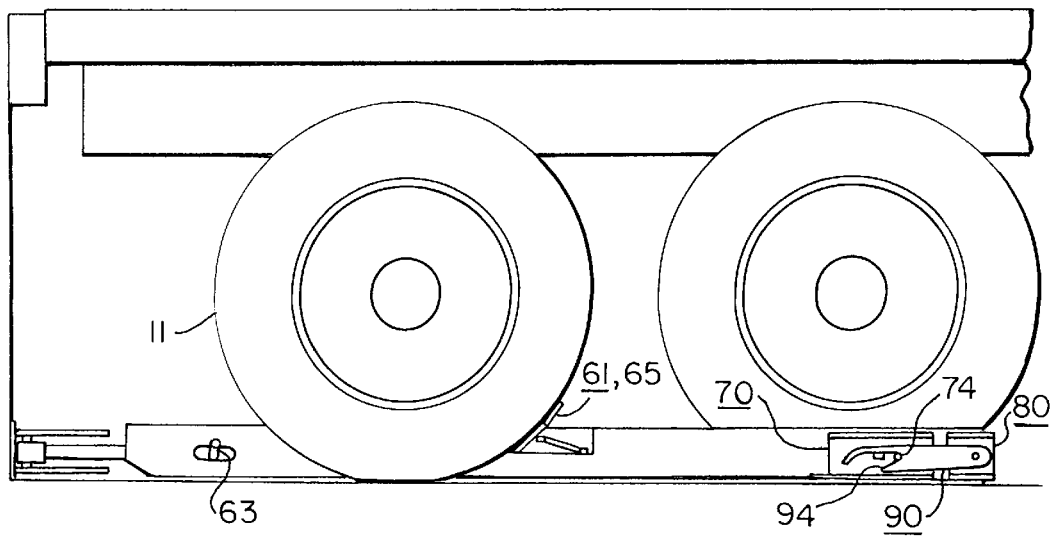

AUTOMATIC WHEEL CHOCK

This is a Continuation of application Ser. No. 08/679,719 filed Jul. 11, 1996 issued as U.S. Pat. No. 5,743,697 on Apr. 28, 1998, which is a Continuation of application Ser. No. 08/350,132 filed Nov. 29, 1994, now abandoned.

BACKGROUND OF THE INVENTION

The need to prevent a vehicle from moving during loading and unloading operations has been addressed by a variety of different techniques. The most basic is the wheel chock, a wedge placed in front of the wheels of the truck. While simple, they are often misplaced, dislodged or slip. Given those known deficiencies a class of mechanical restraints evolved which were either mounted on the dock face or on the approach and moved to engage the truck by interaction with the ICC bar, mounted on the rear of the vehicle. The majority of mechanical vehicle restraints currently in use contact the ICC bar of the transport vehicle to prevent it from moving away from the loading dock by providing a mechanical member resisting vehicle movement away from the dock. While this method is suitable for the majority of trailers, there are several configurations which cannot be secured by the traditional vehicle restraint. These include missing, bent or extremely low ICC bars, and hydraulic tail gates or other special equipment attached to the rear of the vehicle.

Given this problem of missing or irregular ICC bars, renewed interest has taken place in the industry to restrain by chocking the wheels, albeit by mechanical means. Examples of devices which do not rely on the presence of an ICC bar are typified by U.S. Pat. Nos. 4,969,792 and 5,249,905. In these devices the apparatus is buried in a pit in the driveway which causes a wheel chock to be raised from a stored position and drawn rearward to contact the front of a wheel. While providing an effective mechanism to prevent the vehicle from moving away from the dock, these devices have several limitations. First, because it is buried in the driveway, the unit is expensive to install and requires a drain to prevent it from filling with water. Because it chocks only one wheel of the trailer, it may result in lateral loads on the front "landing gear" and may not be effective in preventing "landing gear" collapse. Also, with the great variety of axle placement on trailers, it will be unable to operate if a wheel is positioned over the stored location of the chock. Finally, because it is buried in a pit in the driveway, it may be difficult to service or repair, and cannot be readily moved to a new location. Another automatic chocking device built by Rite-Hite Corporation is mounted on the driveway, but it forms an obstacle which the truck must drive over, and which thus impedes snow removal. In addition, it also would be unable to operate if a wheel is positioned over the stored location of the chock.

SUMMARY OF THE INVENTION

This invention is an automatic wheel chock which has several advantages over existing devices. The primary purpose of a vehicle restraint is to secure the trailer to the loading dock. This system is positioned on the approach and moves outward from the loading dock between the wheels of the device to be restrained. Once in position the chock moves laterally to an operative position blocking a wheel of the vehicle. In a preferred embodiment, a sensor contacts the wheel such that continued movement of the device on the approach results in the chock being fully extended. then, the device reverses direction to bring the chock into contact with the wheel. A pair of chocks, one to block a wheel on each side of the axle may be used. This device provides greater security and stability because it chocks wheels on both sides of the trailer. The mounting of the device also provides lateral freedom which allows it to align itself with the wheels of the trailer.

Retraction of the device is reversal of the process with the chock moving away from the wheel and then retracting to a position in between the wheels. Since there is no engagement with the ICC bar or other part of the vehicle that "floats" during loading and unloading, this system cannot be jammed or locked with the vehicle. Because it is stored retracted against the dock face and approaches the trailer from the rear, it engages the rear-most set of wheels and is not affected by the number or position of other axles. Because it can be easily mounted to the face of an existing dock, the installation does not require the expense of excavation and concrete construction, and can be easily detached and moved to a new location. Since the system is stored retracted against the face of the dock, it allows easier snow removal. Also, because it can rest on the surface on the driveway it does not require trenching and a drain, and is easily accessible for service.

This invention will be described in conjunction with the drawings of the preferred embodiments and the description of the preferred embodiments that follow.

BRIEF DESCRIPTION OF THE DRAWINGS

FIG. 2 is a plan view of the first embodiment of the invention illustrating system extended into position but the chocks not yet extended;

FIG. 3 is a plan view of the first embodiment illustrating the chocks extended;

FIG. 4 is a plan view, partially cut away, of the first embodiment illustrating the elements of the mechanism with the chocks in a stored position;

FIG. 5 is a side view of the first embodiment illustrating the chocks in a stored position;

FIGS. 6A and 6B are top and side views respectively of the latch assembly;

FIG. 7 is a sectional side view of the latch assembly as the cylinder extends to position the system for extension of the chock;

FIG. 8 is a plan view of the first embodiment illustrating the extension of the chocks prior to engagement with a vehicle;

FIG. 9 is a side view illustrating the first embodiment with the chocks in an extended position of FIG. 8;

FIG. 10 is a plan view illustrating the first embodiment with the chocks in the contact position with rear of wheels of the vehicle to be restrained;

FIG. 11 is a side view of the first embodiment illustrating the chocks in contact with the wheels as illustrated in FIG. 10;

FIGS. 16A and 16B are plans view of a second preferred embodiment of this invention employing hydraulic actuation of the chocks, in which FIG. 16B is an enlargement of the actuation portion of the device;

DESCRIPTION OF THE PREFERRED EMBODIMENTS

Figure 1:
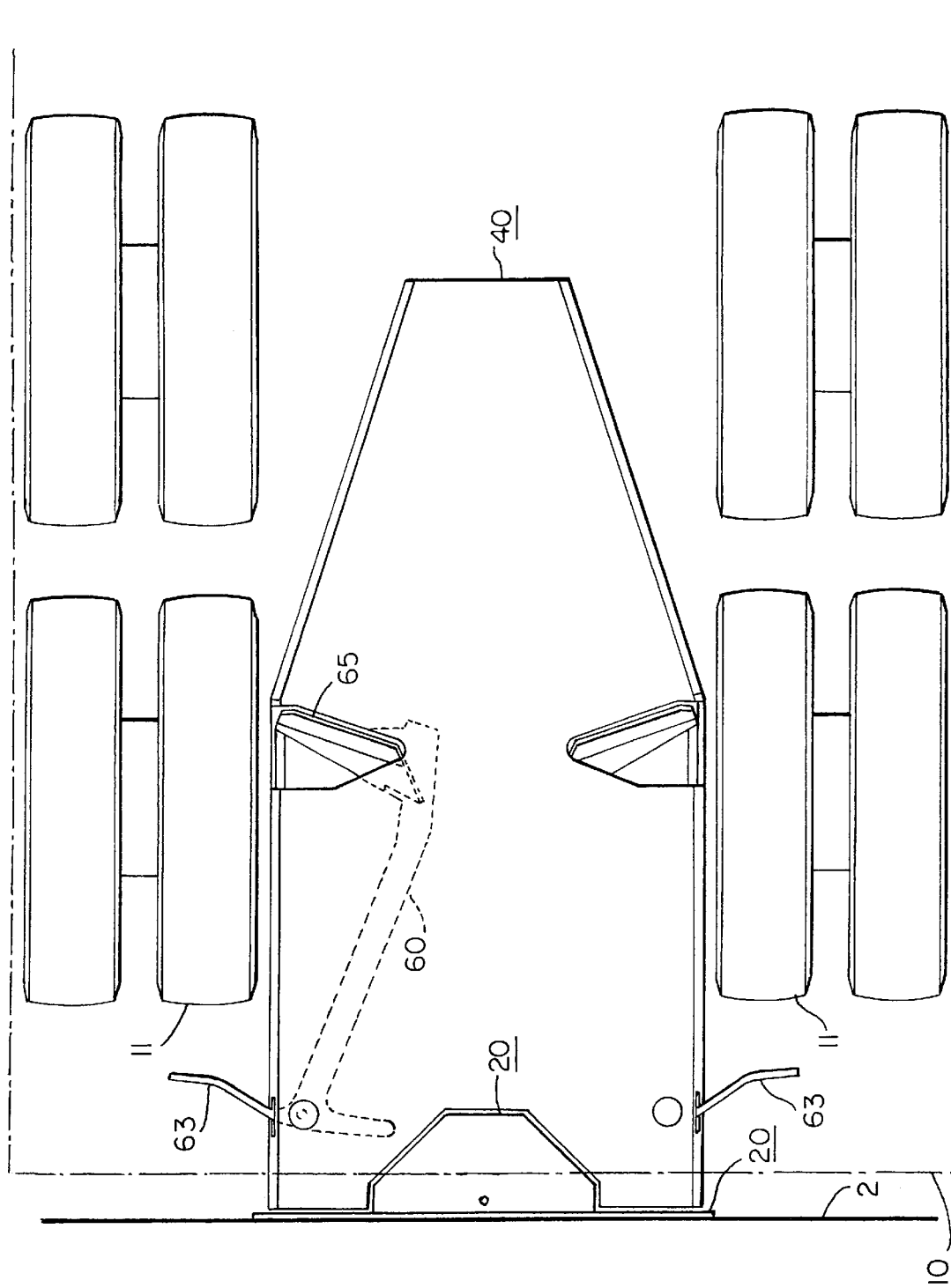
FIG. 1 is a plan view of a first embodiment of the automatic chock illustrating the chocks stored and the system stored before being moved to secure a vehicle.

Referring first to FIGS. 1 through 3 a general description of the concept of this invention will be explained. A truck 10 having wheels 11 is positioned at a loading dock 3. A stationary frame assembly 20 is mounted to the dock wall and serves as an anchor point for one end of an extending mechanism such as an hydraulic cylinder/rod assembly. A moveable housing assembly 40 carries the other end of the hydraulic cylinder/rod assembly for movement away from and toward the wall. FIG. 1 illustrates the housing assembly in a stored position adjacent the wall and between the wheels 11 of the vehicle. FIG. 2 illustrates the housing positioned away from the wall and a sensor arm 63 of a chock assembly 60 in contact with the rear surface of the tire 11. The chock 65 is in the retracted position. By means of an actuating mechanism, to be described herein, the chock is extended to engage the forward portion of the tire. FIG. 3 illustrates two chocks but, it is within the scope of this invention to employ only one. Also as will be described, the chocks are operated together. However, it is within the scope of this invention to have the chocks independently actuated to compensate for misalignment of the vehicle with the housing assembly 40 and small variations in the circumference of tires on the axle due to wear or differences in tread patterns.

FIGS. 4 and 5 illustrate in plan view and side view respectively, the details of a first preferred embodiment of this invention. A typical loading dock has a driveway surface 1, a dock face 2 and a dock floor 3. Dock bumpers 5 limit the position of the transport vehicle 10 and protect the dock wall from impact damage. The vehicle 10 is shown with two axles each having dual wheels 11. An automatic chocking device is shown with the chocks retracted in the stored position. In FIGS. 4 and 5 the device is shown partially cut away to reveal the internal components. FIG. 4 is a plan view showing the structure of the housing assembly 40 and its placement between the wheels 11.

The chocking device has a stationary frame assembly 20 which has a mounting plate 21 attached to the dock wall, and a pair of bracket plates 22 which anchor the end of the rod assembly 110 of the hydraulic cylinder assembly 100 with a pin 25. The tapered edges 23 guide the housing assembly 40 to a center position on the approach when retracted toward the dock wall 2.

Figure 12:
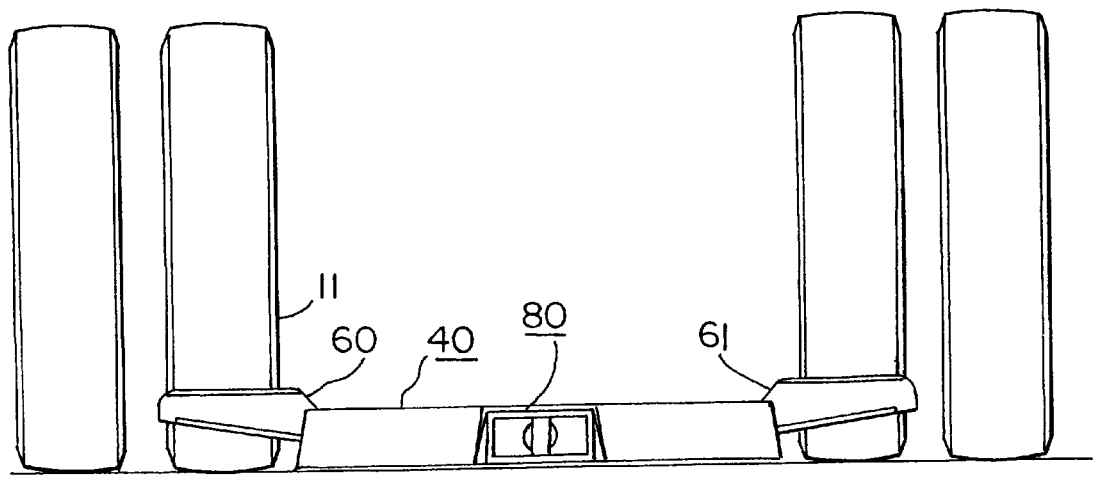
FIG. 12 is a front view of the first embodiment illustrating the chocks in contact with the wheels of the vehicle to be restrained.

The housing assembly 40 provides the structure to support the moving components of the device. As shown in FIGS. 4 and 5 the housing assembly has an upper shell 41 and a lateral beam structure comprising a plate 42, two rear plates 43, and a bottom plate 45. A plate 46 at the front of the housing assembly has an opening to guide the lock assembly 80. A pair of side gussets 47 stiffen the rear of the housing. Each gusset has a hole to carry a pin 48 which provides the pivot for the chock assemblies 60 and 61. As shown in FIG. 4, each chock assembly has a main arm 62, sensor arm 63, control arm 64, and inclined chock surface 65. The gussets 47 are mounted at an angle so that as the chocks rotate outward, the extended position is higher than the retracted position, as shown in FIG. 12.

FIG. 4 also illustrates a control assembly 70 which has two struts 71 connected by a plate 72. Two vertical flanges 73 carry guide pins 74 and 75. The pin 74 extends beyond the inner surface of the flange and the end of the pin has a beveled surface. The outer ends of the pins 74 and 75 are carried in slots in the guide brackets 49 and 50 which are attached to the upper shell 41. The rear end of each strut 71 is connected to the control arm 63 of each chock assembly by a pin 68 so that the chock assemblies 60 and 61 may extend and retract together.

FIG. 4 illustrates a lock assembly 80 which has two struts 81 attached to two vertical flanges 82 and 83 which are connected by two horizontal plates 84. The outer end of the hydraulic cylinder 100 is attached to the lock assembly 80 by a pin 29 carried in a hole in each plate 84. The rear end of each strut 81 has a tapered wedge block 86 which passes through a hole in the plate 42. The flange 82 has a pin 85 which carries the latch assembly 90. The latch assembly is retained by a spring washer, not illustrated.

FIGS. 6A and 6B illustrate a top and side view respectively of the latch assembly 90. The plate 91 has a pivot hole 92, a release finger 93 and an engagement ramp 94. A latch bar 95 is attached at an angle to the underside of the release finger 93. When the chock device is stored, the end of the latch bar 95 engages the inner end of the pin 64 as shown in FIG. 5.

The double acting hydraulic cylinder 100 is of conventional construction with a rod assembly 110 having a rod 111 and a piston 112 as shown on FIG. 8. When hydraulic fluid is pumped in on one side, the pressure on the back of the piston 112 causes the rod assembly 110 to extend, and when hydraulic fluid is pumped in through the other side, the pressure on the front of the piston causes the rod assembly to retract. While not illustrated, the cylinder configuration can be configured to eliminate external plumbing on both ends of the cylinder by placing the ports in the end of the rod 110 assembly. Fluid is carried to the cylinder through hollow passages in the cylinder rod. The rod assembly can be anchored by a pin 25 and the cylinder barrel will move without any hoses being exposed.

In operation of this first preferred embodiment, when no transport vehicle is at the dock, the chocks 60 and 61 are retracted into the sides of the housing assembly 40 as shown on FIGS. 1 and 4. The housing assembly is retracted against the frame assembly 20. When a vehicle 10 is backed up to the dock, the wheels 11 will straddle the housing assembly 40. If the vehicle is backed in not aligned with the dock and the axles are near the rear of the vehicle, the sides of the housing will guide the wheels to the required position. When the chock device is actuated, hydraulic fluid is pumped from a hydraulic power unit (not shown) to an input port on the rod assembly 110. This causes the hydraulic cylinder 100 and the housing assembly 40 to be pushed forward away from the dock wall 2. If the vehicle 10 is not accurately aligned with the dock, the tapered front of the housing 40 will automatically guide it between the wheels of the vehicle. As illustrated in FIG. 4, the rod 110 pivots about the pin 25 so that the device self-aligns with respect to the vehicle.

As the hydraulic cylinder extends, it moves the lock assembly 80 and the latch assembly 90 forward in the housing assembly 40 as shown in enlarged view of FIG. 7. The release finger 93 rides on the upper surface of the pin 74 and causes the latch assembly 90 to rotate clockwise as shown in FIG. 7. The latch assembly is held in the rotated position by the friction of the spring washer 88.

The front ends of the struts 81 contact the back of the front plate 46 and cause the housing assembly 40 to move forward. As the housing assembly 40 continues to move forward, the sensor bars 63 contact the rear of the wheels 11 and the chocks 60 and 61 extend as shown in FIGS. 8 and 9. When the chocks are fully extended, the housing assembly 40 will be prevented from moving and the hydraulic pressure will increase. The increase in pressure will be sensed by an electrical pressure switch or by a spring sequence valve (not shown), both of which are well known in the loading dock industry. The power unit will then direct hydraulic fluid through the port to the rod side of the cylinder 100 and cause the cylinder 100 to retract. The lock assembly 80 will then move rearward as shown in FIGS. 10 and 11. The wedge blocks 86 of the lock assembly 80 will extend through the holes in the plate 42 and lock the chocks in the extended position as shown on FIG. 11. Also, the ramp surface 94 of the latch assembly 90 will engage the pin 74 and cause the latch assembly to rotate counterclockwise to the initial position. The housing assembly 40 will continue to move rearward until the chocks 60 and 61 are held firmly against the wheels 11. The pressure switch will sense the increase in pressure and cause the power unit to stop and the vehicle 10 will be secured.

FIG. 12 illustrates a front view of the chocks extended in front of the wheels. The device in this embodiment is shown riding on the approach. However, a recess in the driveway to further reduce the clearance height of the housing may be used. The recess could be shallow to reduce the stored height by a few inches, or could be the depth of the housing so that only the chock assemblies extend above the driveway. Although the first preferred embodiment has the many advantages described previously, this system could also have the mechanism enclosed in a pit in the driveway with only the chock assemblies extending above the driveway.

Figure 13:
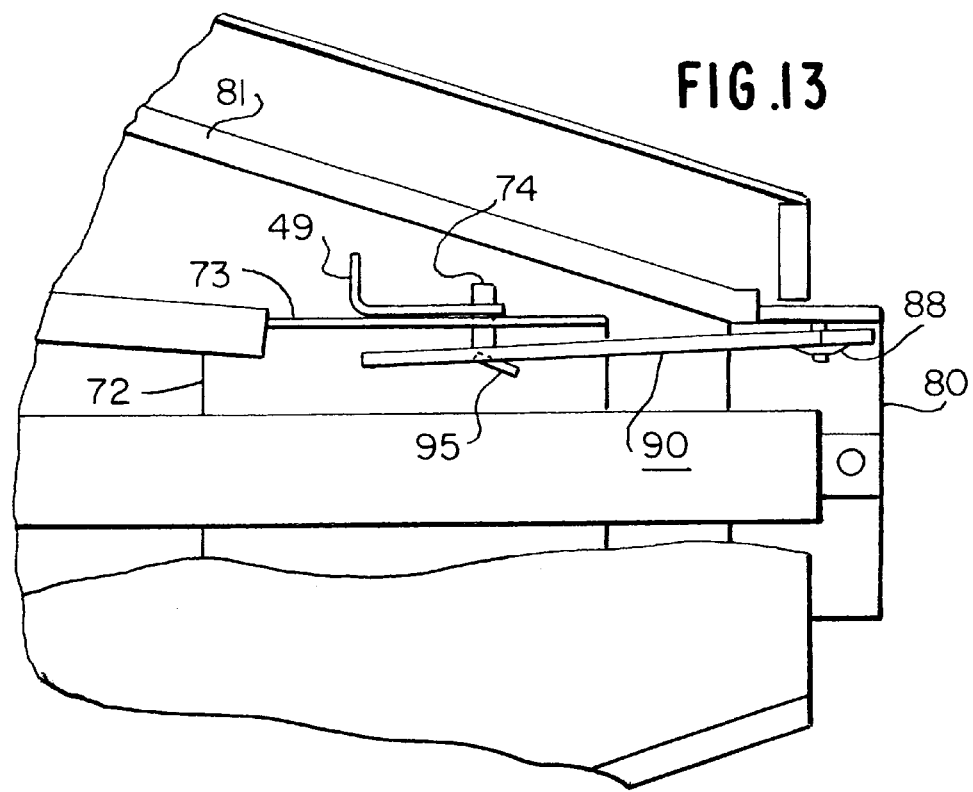
FIG. 13 is a plan view of the first preferred embodiment illustrating the retraction sequence with the latch positioned for retraction of the chocks.
Figure 14:
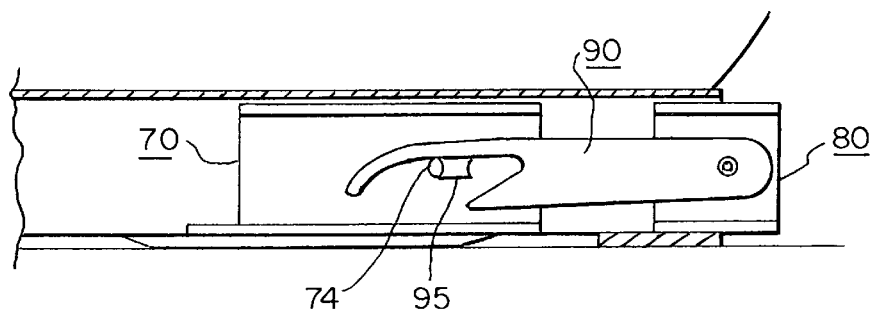
FIG. 14 is a side view of the first embodiment of this invention illustrating the latch in the retraction sequence as illustrated in FIG. 13.

When the loading operation is completed and the vehicle is to be released, the hydraulic cylinder 100 is extended. The lock assembly 80 moves forward and releases the wedge blocks 85 from the chock assemblies 60 and 61. As shown in FIGS. 13 and 14, the latch assembly 90 is deflected laterally allowing the angled latch bar 95 to pass the end of the pin 74 without rotating the latch assembly 90 clockwise. The lock assembly will move the housing assembly 40 forward until the sensor bars 63 again contact the rear of the wheels 11 and the pressure switch will then cause the hydraulic cylinder 100 to retract. The latch bar 95 will engage the pin 74, preventing the lock assembly 80 from engaging the chocks 60 and 61, and also forcing the control assembly 70 to move rearward causing the chock assemblies 60 and 61 to retract to the initial position shown in FIGS. 1 and 4. As the housing assembly 40 moves toward the dock wall 2, the tapered edges 23 of the plates 22 will guide the housing to the center position. When the housing assembly is fully retracted, the pressure switch will sense the increase in hydraulic pres sure and cause the power unit to stop with the chocks in the stored position. An electrical limit switch may be mounted on the frame assembly 20 to sense the full retraction of the hydraulic cylinder and prevent a false signal should the housing assembly encounter an obstacle when retracting.

Figure 15:
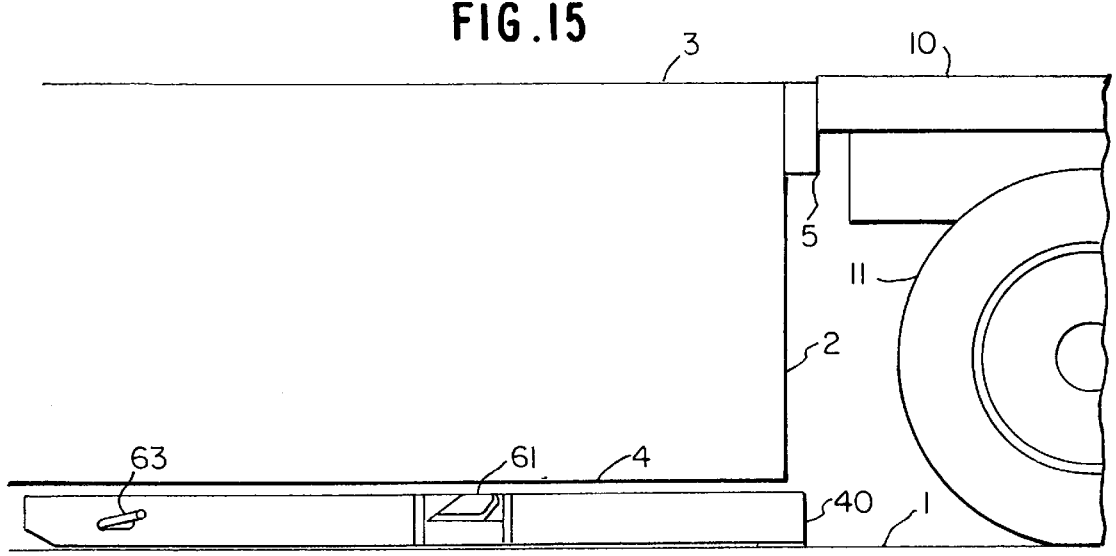
FIG. 15 is a side view of a modification the first embodiment illustrating the system fully retracted and stored under the dock.

While a hydraulic cylinder is shown, this chock system could be powered by other means such as an electric motor driving a screw, or chain and sprockets. Also, there other possible configurations of the latch which controls the locking and release of the chock assemblies. For example a telescopic hydraulic cylinder which can be used to provide extended travel of the housing assembly 40 for vehicles with unusual axle configurations, or when the chock device is stored in a pit 4 under the dock as shown in FIG. 15. The cylinder assembly can have one or more intermediate cylinders between the rod assembly 110 and the outer cylinder 100. Hydraulic fluid pumped through a port will extend both cylinder stages, and fluid pumped through the other port will retract both.

Figure 16A:
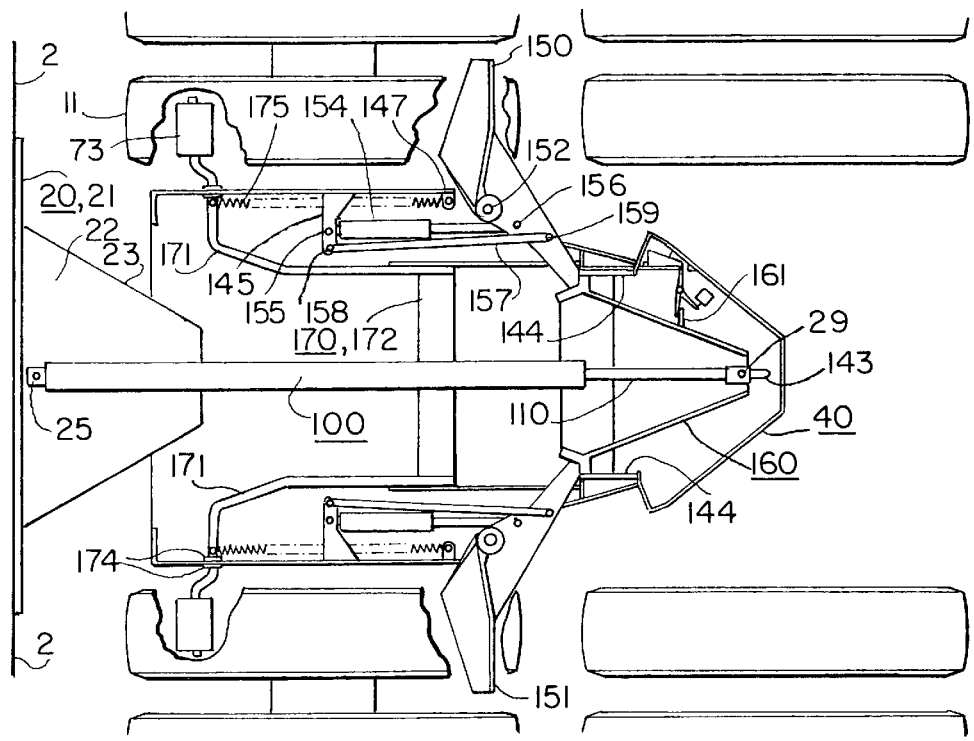
Figure 16B:
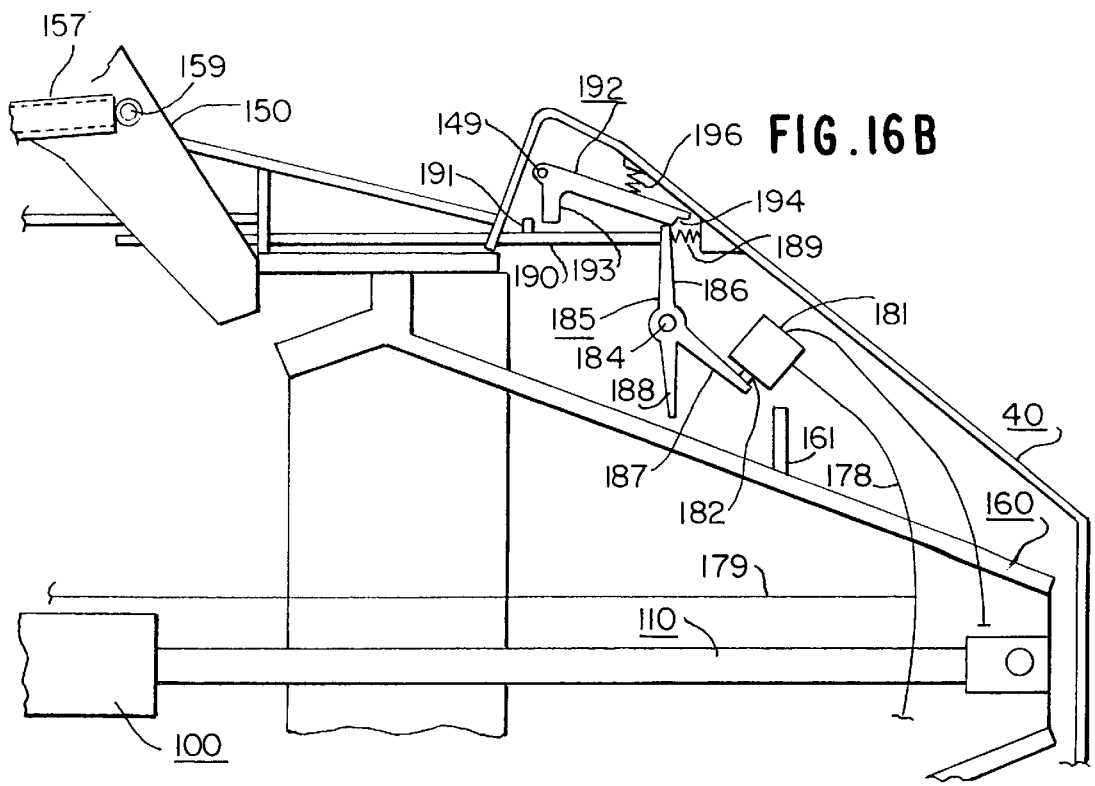

FIGS. 16A and 16B illustrate a second preferred embodiment of this invention. As in the case of the first embodiment this embodiment is used at a typical loading dock as in FIG. 1 which has a driveway surface 1, a dock face 2 and a dock floor 3. Dock bumpers 5 limit the position of the transport vehicle 10 and protect the dock wall from impact damage. FIG. 16A shows a plan view of the chock system of a second preferred embodiment with the chocks 150 and 151 extended to engage the wheels 11 of the transport vehicle. The engagement of the chocks with the wheels is illustrated, it being understood that the steps of deployment will be similar to those in the first embodiment. Also, with the chocks retracted the vehicle can freely enter or exit the dock area as in the first embodiment.

FIG. 16B provides a plan sectional view showing the internal components of the chock system in accordance with the second preferred embodiment. The vehicle 10 has one or more axles, typically with dual wheels. The chock device engages both the inner rear wheels 11, which are shown cut away to reveal the chocking and sensing components. In greater detail, this embodiment has a stationary frame assembly 20 which has a mounting plate 21 attached to the dock wall, and a pair of bracket plates 22 which anchor one end of the hydraulic cylinder 100 with a pin 25. The tapered edges 23 guide the movable housing 40 to a central position when retracted toward the dock wall. The hydraulic cylinder has a rod assembly 110 which is fastened to the lock assembly 160 by the pin 29. A lug 161 is mounted to the side of the lock assembly 160.

The housing assembly 40 provides the structure to support the pivoting chock assemblies 150 and 151, and the actuating mechanisms. The chock assemblies 150 and 151 pivot on pins 152 which are supported by holes in the upper and lower support surfaces of the housing assembly 40. The pivot pins 152 are inclined so that the chock assemblies 150 and 151 project higher when extended than when retracted. Thus the extended height can be eight or ten inches above the driveway while the height of the housing assembly can be several inches lower. As shown in FIG. 16A, a pin 29 passes through slotted holes 143 in the upper and lower plates of the housing assembly 40.

A bracket 145 is mounted on each side of the housing assembly 40. One end of a hydraulic cylinder 154 is attached to the bracket by a pin 155, and the other end is attached to the chock assemblies 150 and 151 by a pin 159. A sensor bar assembly 170 comprises two sensor bars 171, a cross beam 172 and two rollers 173. Flanges 174 restrain the bars 171 from lateral movement as they are guided longitudinally by slotted holes 146 in each side of the housing assembly 40. One end of a spring 175 is attached to the bar 171 and the other is attached to a bracket 147 mounted on the housing assembly 40.

A double-acting hydraulic cylinder assembly 100 moves the housing assembly 40 away from and towards the dock wall 2. When hydraulic fluid is pumped in through one port, the pressure on the back of the piston causes the rod assembly 110 to extend. When hydraulic fluid is pumped through the other port, the pressure on the front of the piston causes the rod 110 assembly to retract. The rod is hollow to allow hydraulic fluid to flow from the extend side of the piston to an outlet port at the end of the rod to provide power to the chock cylinders 154.

A pin 184 is attached to the housing assembly 40 and carries a lever assembly which has three levers 186, 187 and 188. A spring 189 biases the lever assembly counterclockwise to force the lever 187 against the plunger of a valve assembly 182. The valve plunger has two positions, and in the depressed position, fluid is allowed to flow only from the main cylinder 100 towards the chock cylinders 154. In the shifted position, the fluid is allowed to flow only from the chock cylinders 154 toward the main cylinder 100 and back to the reservoir of the hydraulic power unit (not shown). A push rod assembly 190 is guided by holes in the housing assembly 40 and is urged rearward by the spring 189 and lever 186. The rod 190 has a lug 191 protruding from the side. A pin 149 is mounted on the housing assembly 40 and carries a latch arm assembly 192 which has a lever 193 and a notch 194 at the end of the arm. A spring 196 biases the latch arm assembly clockwise against the end of the lever 186.

When no transport vehicle is at the dock, the chocks 150 and 151 are retracted into the sides of the housing assembly 40. The housing assembly is retracted against the frame assembly and the dock wall as in the first preferred embodiment. When a vehicle 10 is backed up to the dock, the wheels 11 will straddle the housing assembly 40. If the vehicle is backed in not aligned with the dock and the wheels are near the rear of the vehicle, the sides of the housing will guide the wheels to the required position on each side of the housing assembly 40. When the chock system is actuated, hydraulic fluid is pumped from a hydraulic power unit (not shown) to the cylinder 100 and causes the housing assembly 40 to be pushed forward away from the dock wall 2. If the vehicle is not accurately aligned with the dock, the tapered front of the housing 40 will automatically guide it between the wheels of the vehicle. As shown in FIG. 16A, the springs 175 hold the sensor bar assembly 170 forward. The front surface of the sensor bar assembly 170 forces the rod 190 forward against the lever 186 and compresses the spring 195. The lever 187 is moved away from the valve assembly 182, releasing the plunger of that device and fluid is not allowed to flow to the chock cylinders 154.

As the housing assembly 40 moves forward, the rollers 173 of the sensor bar assembly 170 will contact the rear of the wheels as shown in FIG. 16A. As the housing continues to move forward, the sensor bar assembly 170 is held by the wheels 22 of the vehicle 10 and is pulled away from the end of the rod 190. The spring 189 urges the lever 186 to rotate counterclockwise, moving the rod 190 rearward and actuating the plunger of valve 182 as shown in FIG. 16B. The chocks will then begin to extend.

Because the main cylinder 100 and the chock cylinders 154 are restrained from moving, the hydraulic pressure will increase and can be sensed by an electrical pressure switch or by a spring sequence valve (not shown) which is well known in the loading dock industry. The power unit will then switch hydraulic fluid to the front side of the cylinder 100 and cause the rod 110 to retract. The lock assembly 160 will move rearward, guided by the bars 144 and the pin 29 moving in the slotted holes 143. As shown in FIG. 16A, the inner ends of the chock assemblies 150 and 151 will be locked in the extended position by the rear corners of the lock assembly 160. The chock assemblies 150 and 151 are forced against the front of the wheels 11 and the vehicle is securely restrained.

As the lock assembly 160 is moved rearward, the lug 161 contacts the lever 188 and causes the lever assembly 185 to rotate clockwise as shown in FIG. 16A. The lever 187 released the plunger of the valve assembly 182 and allows hydraulic fluid to flow only from the chock cylinders 154 back to the power unit. Because the chocks 150 and 151 are held extended by the lock assembly 160 there is no flow of hydraulic fluid but the pressure in the chock cylinders 154 is relieved. When the lever assembly 185 rotates, the spring 193 causes the latch arm assembly to rotate clockwise and the notch 194 engages the end of the lever 186. This is illustrated in FIG. 16. When the loading operation is completed and the vehicle is to be released, the hydraulic cylinder 100 is extended. The lock assembly 160 moves forward and releases the chock assemblies 150 and 151. The lug 161 will have moved away from the lever 188, but the spring 189 cannot cause the lever assembly 185 to rotate because it is restrained by the latch arm assembly 193. Thus the valve assembly 181 remains in the unactuated position. When the main cylinder 100 stops extending, the springs 156 cause the chock assemblies to rotate inward towards the retracted position, forcing hydraulic fluid from the cylinders 154 back to the power unit. Hydraulic fluid is then directed to the rod side of the cylinder 100 and the housing assembly 40 is retracted to the stored position against the dock wall 2 as shown in FIG. 1. The springs 156 urge the sensor bar assembly 170 forward. The front surface of the sensor bar assembly forces the rod 190 forward. The latch bar 193 is forced counterclockwise to disengage the lever 186 but the lever assembly 185 remains held against the spring 189 and out of engagement with the plunger of the valve assembly 182.

This invention is not limited to the first and second preferred embodiments described above. It is within the scope of this invention to include any automatic chocking device which moves between the wheels and extends laterally to secure the vehicle.

Several alternate embodiments will be described to illustrate the scope of this invention in a non-limiting sense.

Figure 17:
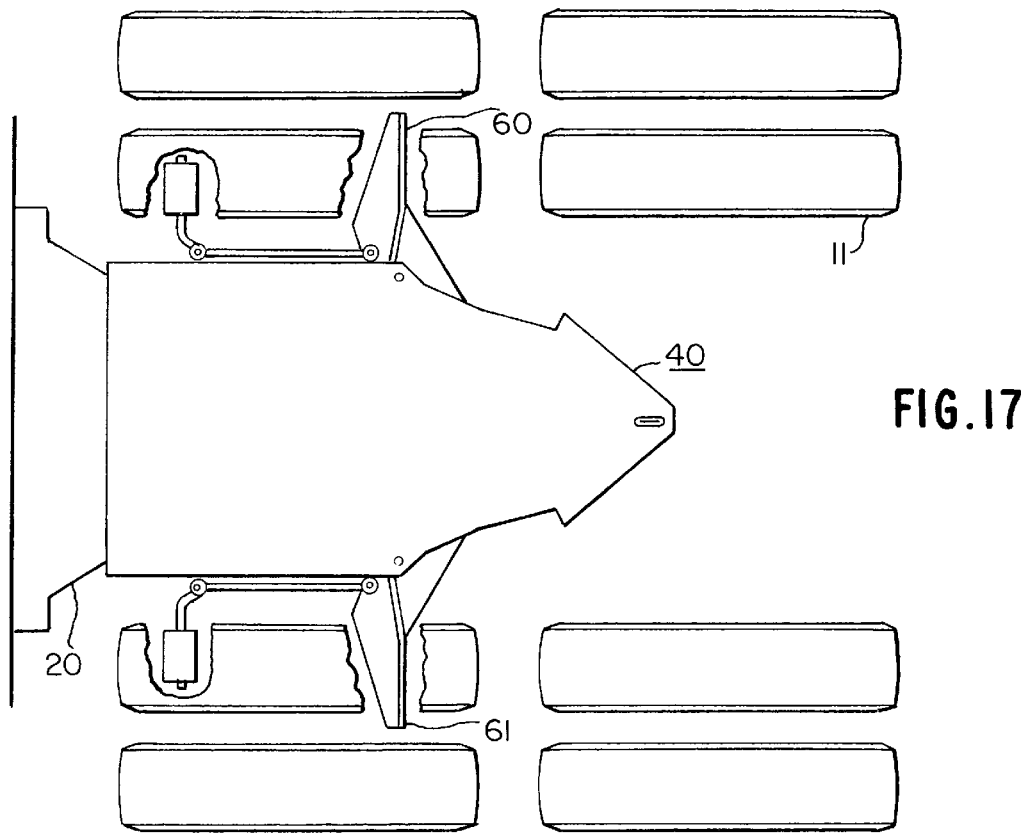
FIG. 17 is a plan view of a third preferred embodiment of this invention/using direct mechanical deployment of the chocks.

FIG. 17 illustrates a third preferred embodiment of this invention with the chocks being extended mechanically by rods connected directly from the sensor arms to the chocks, rather than using hydraulic cylinders.

Figure 18:
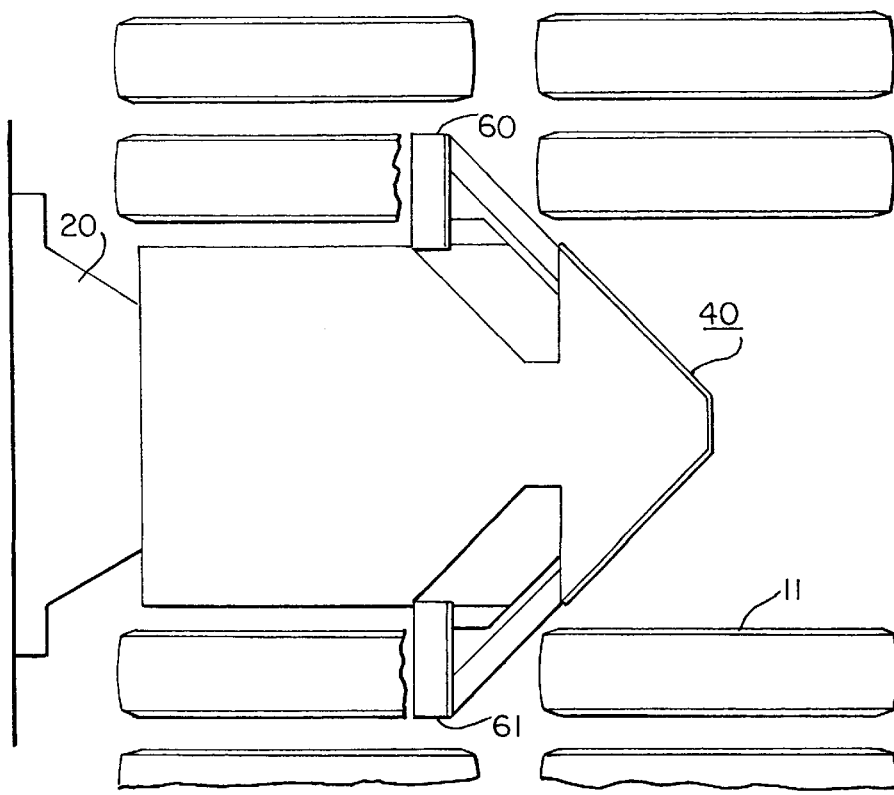
FIG. 18 is plan view of a fourth embodiment of this invention illustrating an alternative actuation mechanism.

FIG. 18 illustrates a fourth preferred embodiment of this invention with the chocks extending linearly, rather than rotating.

While this invention has been described with respect to the preferred embodiments and variations thereto it is apparent that modifications and other configurations are within the scope of this invention.

I claim:

1. A system for restraining a vehicle having a pair of separated tires which is positioned at a loading dock said system comprising: an extending guide, a carrier member having a mounting to said extending guide, said carrier member and slidably movable with said extending guide from a stored position, a wheel chock carried by said carrier member, a mount for said wheel chock on said carrier so that transverse movement of said wheel chock occurs to block a wheel of a vehicle, a sensor, carried by said carrier member, a mount for said sensor to said carrier to position said carrier member proximate to said tire, said sensor movable to cause transverse movement of said wheel chock when it contacts one of said pair of tires and, drive means for moving said extending guide and said carrier member from said stored position to an operative position and then back toward said stored position to engage said wheel chock with a rear most tire of said pair of separated tires.

2. A system according to claim 1 further comprising an actuating member coupled to said sensor to extend said at least one chock after said sensor contacts a tire of said pair of tires.

3. A system according to claim 1 further comprising a pivot to permit said corner member to move into alignment with said separated pair of tires.

4. A system according to claim 1 further comprising a recess under said loading dock, said recess housing said member and said at least one chock in an inoperative position.

5. A system according to claim 1 further comprising a pivotable sensor carried by said carrier member to determine the position of said carrier member relative to said pair of separated tires as said carrier member moves from said stored position to said operative position.

6. A system according to claim 5 further comprising an actuating member coupled to said sensor; said sensor movable to extend said wheel chock after said sensor contacts a tire.

7. A system according to claim 5 wherein said means comprises fluidic means for moving said carrier member from a stored position to an operative position between said pair of wheels.

8. A system according to claim 7 wherein said drive means further comprises fluidic means for extending said wheel chock and moving said carrier member in a direction toward said stored position to engage said wheel chock with a tire when said wheel chock is in said outward extended position.

9. A system for restraining a vehicle positioned at a loading dock, said vehicle having a pair of separated tires mounted on an axle, said system comprising;

a carrier member positionable under said vehicle and adjacent said pair of separated tires, a power source operably coupled to said carrier member to move said carrier member from a stored position adjacent the loading dock to an operative position adjacent said pair of separated tires, at least one wheel chock mounted on said carrier member, a mount for said wheel chock to have said wheel chock movable from a stored position when the carrier is positioned adjacent said separated tires to an outward extended position engaging at least one tire of said pair of tires, when said carrier member is positioned in said operative position and a sensor carried by said carrier member, said sensor being an integral component with said wheel chock to contact said tire and due to movement of said carrier cause said wheel chock to extend outward as said carrier member moves from said stored position to said operative position.

10. A system according to claim 9 wherein the power source moves said carrier member in a first direction from the stored position to the operative position for placement relative to the pair of separated tires and then moves said carrier member in an opposite direction to contact said wheel chock with said one of said pair of tires.

11. A system according to claim 9 further comprising a pivot to permit said wheel chock to move into alignment with a tire of said pair of separated pair of tires.

* * * * *